US010038828B2

(12) United States Patent
Tsukagoshi

(10) Patent No.: US 10,038,828 B2
(45) Date of Patent: Jul. 31, 2018

(54) INFORMATION PROCESSING APPARATUS, INFORMATION PROCESSING METHOD, DISPLAY CONTROL APPARATUS, DISPLAY CONTROLLING METHOD, AND PROGRAM FOR DISPLAY OF A PLURALITY OF VIDEO STREAMS

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 188 days.

(21) Appl. No.: 14/016,649

(22) Filed: Sep. 3, 2013

(65) Prior Publication Data

US 2014/0002744 A1     Jan. 2, 2014

Related U.S. Application Data

(63) Continuation of application No. 12/448,989, filed as application No. PCT/JP2008/071086 on Nov. 20, 2008, now Pat. No. 8,553,760.

(30) Foreign Application Priority Data

Nov. 20, 2007    (JP) ............................... P2007-300623
Jan. 31, 2008    (JP) ............................... P2008-020334

(51) Int. Cl.
*H04N 5/14*        (2006.01)
*G06F 3/14*        (2006.01)
(Continued)

(52) U.S. Cl.
CPC ........... *H04N 5/147* (2013.01); *G06F 3/1431* (2013.01); *H04N 5/2624* (2013.01);
(Continued)

(58) Field of Classification Search
CPC ..................................................... H04N 5/147
See application file for complete search history.

(56) References Cited

U.S. PATENT DOCUMENTS 6,204,887 B1 *   3/2001   Hiroi ....................... G09G 5/14
                                                                              348/565
2004/0060061 A1 *   3/2004   Parker ................ H04N 5/44591
                                                                               725/38

(Continued)

FOREIGN PATENT DOCUMENTS

CN           1474596 A      2/2004
CN           1571508 A      1/2005
(Continued)

OTHER PUBLICATIONS

Chinese Office Action for Application No. 201410106271.5 dated Sep. 1, 2016.

*Primary Examiner* — James Pontius
(74) *Attorney, Agent, or Firm* — Lerner, David, Littenberg, Krumholz & Mentlik, LLP

(57) ABSTRACT

An information processing apparatus, an information processing method, a display control apparatus, a display controlling method, and a program may allow a provider subjectively to control the manner in which to display pictures using of a plurality of video streams. A transmission device generates video streams used for picture display of a single program. The video streams are multiplexed into a multiplexed stream to which compose information is added. The multiplexed information together with the added compose information is supplied to a reception device. The compose information includes information designating the video streams for displaying pictures in various positions on a screen. The reception device decodes the video streams included in the multiplexed stream. The pictures from the decoded video streams are displayed on the screen in (Continued)

accordance with information included in the compose information. This information can be applied to apparatuses handling a plurality of video streams.

13 Claims, 15 Drawing Sheets

(51) Int. Cl.
H04N 5/445 (2011.01)
H04N 7/01 (2006.01)
H04N 21/235 (2011.01)
H04N 21/2362 (2011.01)
H04N 21/2365 (2011.01)
H04N 21/431 (2011.01)
H04N 21/434 (2011.01)
H04N 21/435 (2011.01)
H04N 5/262 (2006.01)
H04N 21/2343 (2011.01)
H04N 21/6547 (2011.01)
H04N 13/00 (2018.01)
H04N 19/597 (2014.01)

(52) U.S. Cl.
CPC ....... *H04N 5/44591* (2013.01); *H04N 7/0122* (2013.01); *H04N 21/235* (2013.01); *H04N 21/2362* (2013.01); *H04N 21/2365* (2013.01); *H04N 21/234363* (2013.01); *H04N 21/435* (2013.01); *H04N 21/4316* (2013.01); *H04N 21/4345* (2013.01); *H04N 21/4347* (2013.01); *H04N 21/6547* (2013.01); *G09G 2300/026* (2013.01); *H04N 13/0048* (2013.01); *H04N 13/0059* (2013.01); *H04N 19/597* (2014.11)

(56) References Cited

U.S. PATENT DOCUMENTS

| | | | |
|---|---|---|---|
| 2004/0184523 A1* | 9/2004 | Dawson | H04N 7/17318 375/240.1 |
| 2005/0212968 A1 | 9/2005 | Ryal | |
| 2005/0213946 A1* | 9/2005 | Braun | H04N 5/775 386/230 |
| 2006/0132504 A1 | 6/2006 | Tobita | |
| 2006/0209206 A1* | 9/2006 | Wang | H04N 7/152 348/385.1 |
| 2008/0013925 A1* | 1/2008 | McCrossan | G11B 27/105 386/336 |

FOREIGN PATENT DOCUMENTS

| | | |
|---|---|---|
| JP | 04329593 B2 | 11/1992 |
| JP | 06-006773 A | 1/1994 |
| JP | 08307844 A | 11/1996 |
| JP | 11275480 | 10/1999 |
| JP | 2000-013712 A | 1/2000 |
| JP | 2003280623 A | 10/2003 |
| JP | 2003-348478 A | 12/2003 |
| JP | 2005-223413 A | 8/2005 |
| JP | 2006-180091 A | 7/2006 |
| JP | 2006-217662 A | 8/2006 |
| JP | 2007-166204 A | 6/2007 |
| JP | 2009-503600 A | 1/2009 |
| JP | 2009-527995 A | 7/2009 |

* cited by examiner

TIME

```
1:Window_Linkage_flag
2:If(Window_Linkage_Flag){
3:          Number_of_Screens,S
4:          For(i=0;i<S;i++){
5:                  Direction_Mapping
6:                  Target_Display_Size
7:                  Number_of_Windows_per_screen,N
8:                  For(j=0;j<N;j++){
9:                          Elementary_PID
10:                         Window_id
11:                         FrameGroup
12:                         V_offset
13:                         H_offset
14:                 }
15:         }
16:}
```

FIG.19

| TABLEID | SECTION SYNTAX INDICATOR | PRIVATE INDICATOR | FIXED AT '11' | PRIVATE SECTION LENGTH | PRIVATE_DATA |
|---|---|---|---|---|---|

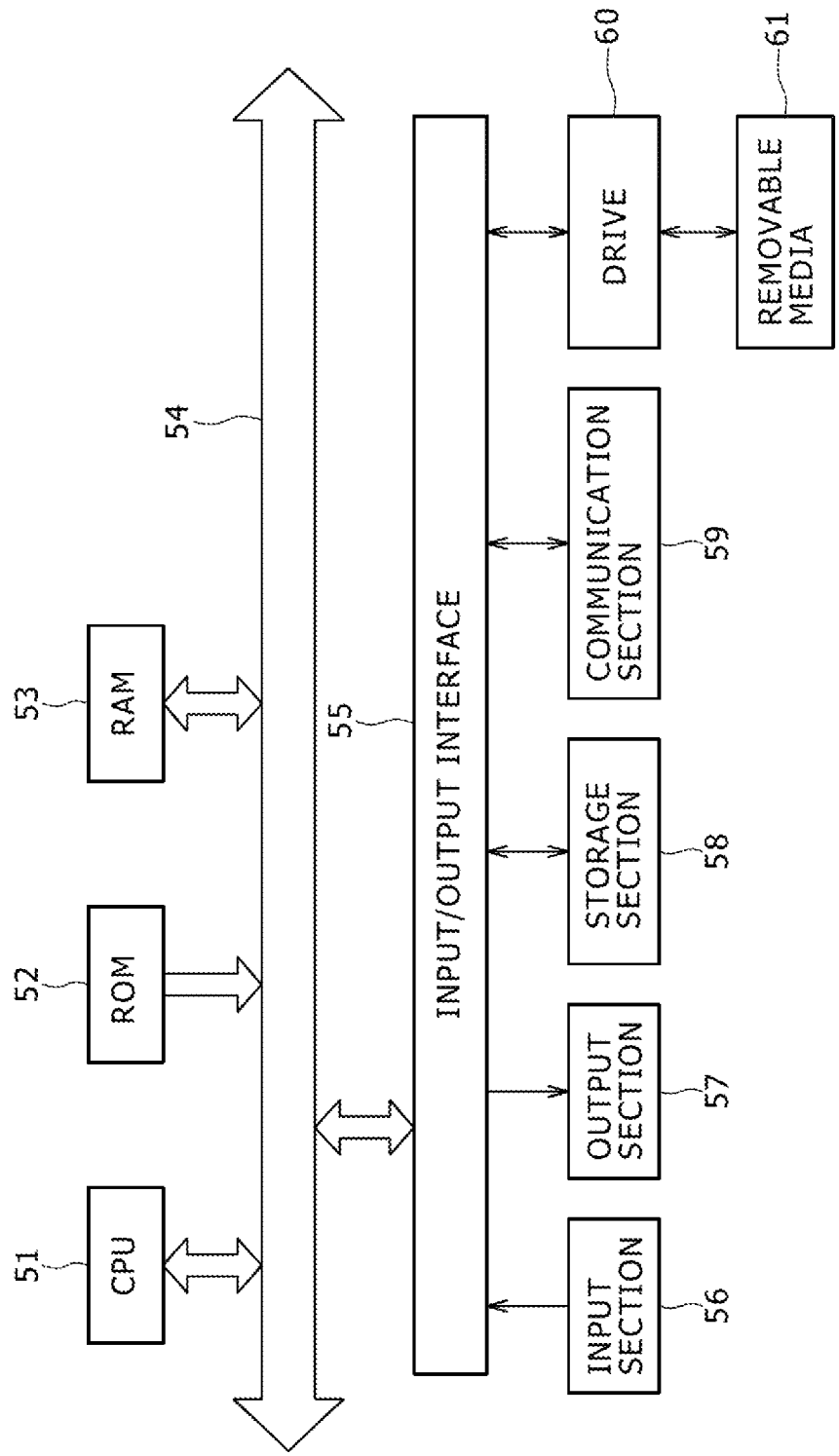

INFORMATION PROCESSING APPARATUS, INFORMATION PROCESSING METHOD, DISPLAY CONTROL APPARATUS, DISPLAY CONTROLLING METHOD, AND PROGRAM FOR DISPLAY OF A PLURALITY OF VIDEO STREAMS

CROSS-REFERENCES TO RELATED APPLICATIONS

The present application is a continuation of U.S. application Ser. No. 12/448,989, filed on Oct. 20, 2009, which application is a national phase entry under U.S.C. § 371 of International Application No. PCT/JP2008/071086 filed Nov. 20, 2008, published on May 28, 2009 as WO 2009/066715 A1, which claims priority from Japanese Patent Application No. JP 2007-300623 filed in the Japanese Patent Office on Nov. 20, 2007 and Japanese Patent Application No. JP 2008-020334 filed in the Japanese Patent Office on Jan. 31, 2008, all of which are incorporated herein by reference.

TECHNICAL FIELD

The present invention relates to an information processing apparatus, an information processing method, a display control apparatus, a display controlling method, and a program. More particularly, the invention relates to an information processing apparatus, an information processing method, a display control apparatus, a display controlling method, and a program for allowing a provider subjectively to control the manner in which to display pictures using a plurality of video streams.

BACKGROUND ART

Multi-screen display techniques have been implemented or proposed whereby a plurality of streams derived from broadcasts, networks, or storage are multidecoded into a plurality of pictures to be displayed on a single display.

For example, when a plurality of pictures are displayed in a so-called PinP (Picture in Picture) format, the user can watch the picture of a program on a given channel displayed in large form on a main screen while viewing the picture of a program on another channel display in small form on a sub screen.

And when the pictures of programs on two different channels are displayed side by side in the right-hand half and the left-hand half of the display, the user can simultaneously watch the pictures of the programs on the two channels.

Japanese Patent Laid-Open No. 2000-13712, filed Jun. 25, 1998 in the Japanese Patent Office, discloses techniques which, when multi-screen display is designated in a normal display state, permit quick switchover to multiple screens.

Patent Document 1: Japanese Patent Laid-Open No. 2000-13712

DISCLOSURE OF INVENTION

Technical Problem

Generally, the streams to be used for ordinary multi-screen display are of different programs. For example, in the case of the above-mentioned PinP multi-screen display, the stream providing the source of the picture to be display on the main screen and the stream providing the source of the picture to be displayed on the sub screen are frequently of different programs.

That is, there is no function that would allow the provider to specify how to coordinate a plurality of streams for picture display, in such a manner that the same program would be displayed on the main and the sub screens as viewed from different angles, whereby the single program would be provided to the user.

Also, whether multi-screen display is given in the ordinary PinP format or involves the left-hand half and the right-hand half of the screen showing pictures side by side, the manner in which the display is provided depends on the implementation of the display device and is not designated by the provider.

From now on, with the popularization of displays having at least the resolution of full HD (High Definition), broadcasts or media may be prepared in such a manner that a single program is provided using a plurality of pictures displayed on a single display screen. In such cases, there may be demands for the provider of programs to subjectively control the manner in which to display the pictures involved.

The present invention has been made in view of the above circumstances and envisages allowing the provider subjectively to control the manner in which to display pictures using a plurality of video streams.

Technical Solution

An information processing apparatus according to a first aspect of the present invention includes: multiplexing means for multiplexing video streams including vertical and horizontal picture size information; adding means for adding compose information to a multiplexed stream obtained through multiplexing by the multiplexing means, the compose information having first information designating a screen used for picture display, second information designating the number of windows formed on the screen, third information designating the video streams used for picture display in the windows, and fourth information designating the positions of the windows on the screen; and providing means for providing a display control apparatus with the multiplexed stream to which the adding means has added the compose information, the display control apparatus controlling the display of pictures on the screen.

The windows may be variable in size.

The adding means may add to the multiplexed stream the compose information further including information designating the number of screens used for picture display as well as the first through the fourth information about the respective screens.

The adding means may add to the multiplexed stream the compose information further including information designating the timing at which to form the windows.

The multiplexing means may set a display timestamp for designating the display timing at which to display simultaneously some of the pictures derived from the video streams for displaying the pictures in the respective windows.

The adding means may add to the multiplexed stream the compose information further including information designating the size of the screen designated by the first information.

An information processing method or a program according to the first aspect of the present invention includes the steps of: multiplexing video streams including vertical and horizontal picture size information; adding compose information to a multiplexed stream obtained through multiplexing, the compose information having first information designating a screen used for picture display, second information designating the number of windows formed on the screen, third information designating the video streams used for picture display in the respective windows, and fourth information designating the positions of the respective windows on the screen; and providing a display control apparatus with the multiplexed stream to which the compose information has been added, the display control apparatus controlling the display of pictures on the screen.

A display control apparatus according to another aspect of the present invention acquires a multiplexed stream provided by an information processing apparatus for picture display, the multiplexed stream being obtained by multiplexing video streams including vertical and horizontal picture size information, the information processing apparatus adding to the multiplexed stream compose information including first information designating a screen used for picture display, second information designating the number of windows formed on the screen, third information designating the video streams used for picture display in the respective windows, and fourth information designating the positions of the respective windows on the screen, the display control apparatus having: separating means for separating the multiplexed stream into the video streams; analyzing means for analyzing the compose information added to the multiplexed stream so as to detect the video streams used for picture display based on the third information regarding each of the windows of which the number is designated by the second information, to detect the sizes of the windows based on the size information included in the detected video streams, and to form the windows of the detected sizes in those positions designated by the fourth information which are on the screen designated by the first information; decoding means for decoding the video streams; and display controlling means for displaying in the respective windows the pictures obtained through decoding by the decoding means.

The compose information may further include information designating the size of a target screen; and, if the size designated by the further-included information is different from the size of the designated screen, then the display controlling means may change the sizes of the pictures obtained through decoding by the decoding means.

A display controlling method or a program according to the other aspect of the present invention includes the steps of: separating a multiplexed stream into video streams; analyzing compose information added to the multiplexed stream so as to detect the video streams used for picture display based on third information regarding each of the windows of which the number is designated by second information, to detect the sizes of the windows based on size information included in the detected video streams, and to form the windows of the detected sizes in those positions designated by fourth information which are on a screen designated by first information; decoding the video streams; and displaying in the respective windows the pictures obtained through decoding.

According to the first aspect of the present invention, video streams including vertical and horizontal picture size information are multiplexed; compose information is added to a multiplexed stream obtained through multiplexing, the compose information including first information designating a screen used for picture display, second information designating the number of windows formed on the screen, third information designating the video streams used for picture display in the respective windows, and fourth information designating the positions of the respective windows on the screen; and a display control apparatus is provided with the multiplexed stream to which the compose information has been added, the display control apparatus controlling the display of pictures on the screen.

According to the second aspect of the present invention, a multiplexed stream is separated into video streams; compose information added to the multiplexed stream is analyzed so as to detect the video streams used for picture display based on third information regarding each of the windows of which the number is designated by second information, to detect the sizes of the windows based on size information included in the detected video streams, and to form the windows of the detected sizes in those positions designated by fourth information which are on a screen designated by first information; the video streams are decoded; and the pictures obtained through decoding are displayed in the respective windows.

Advantageous Effects

According to the present invention the provider can subjectively control the manner in which to display pictures using a plurality of video streams.

BRIEF DESCRIPTION OF DRAWINGS

FIG. 19 is a view showing where compose information is typically inserted.

FIG. 20 is a block diagram showing a typical structure of a personal computer.

EXPLANATION OF REFERENCE SYMBOLS

1 Transmission device, 2 Reception device, 3 Screen, 11-1 through 11-n Encoders, 12 Multiplexer, 13 Compose information addition section, 14 Transmission section, 21 Reception section, 22 Demultiplexer, 23 Compose information analysis section, 24-1 through 24-n Decoders, 25 Display control section

BEST MODE FOR CARRYING OUT THE INVENTION

Figure 1:
FIG. 1 is a view showing a typical configuration of a system providing programs and practiced as one embodiment of the present invention.

FIG. 1 is a view showing a typical configuration of a system providing programs and practiced as one embodiment of the present invention.

As shown in FIG. 1, the providing system is made up of a transmission device 1 and a reception device 2. The reception device 2 is connected with a screen 3 by means of a cable or the like.

The transmission device 1 is a device set up on the side of a program provider such as a broadcasting station.

The transmission device 1 separates the picture of one program taken by one camera into a predetermined number of areas per frame, and encodes the pictures of the separated areas into separate streams or encodes the pictures of one program taken by a plurality of cameras into separate streams respectively, thereby generating a plurality of video streams (PES (Packetized Elementary Stream)) for use in displaying the pictures of one program.

Also, the transmission device 1 multiplexes a plurality of generated video streams into a multiplexed stream (TS (Transport Stream)) for use in displaying the pictures of one program.

The transmission device 1 adds four-dimensional compose map information to the multiplexed stream generated, and provides the reception device 2 with the program constituted by the multiplexed stream to which the four-dimensional compose map information has been added. Programs are provided by use of broadcast waves, over networks, or by means of recording media such as a DVD (Digital Versatile Disc) or Blu-ray (registered trademark) Disc.

Four-dimensional compose map information represents the display relations between a plurality of streams sharing a given time period as a single program, the information being given to the reception device 2 by the transmission device 1 specifying how to coordinate respective video streams making up the multiplexed stream for the display of pictures. In the ensuing description, the four-dimensional compose map information may be simply referred to as the compose information where appropriate.

The compose information includes, among others, information designating the video streams to be used in displaying pictures in various positions on the screen 3. As will be discussed later, where a plurality of screens are set up on the side of the reception device 2, the compose information will include information about the respective screens.

The reception device 2 is set up on the program receiving side such as in the household.

The reception device 2 receives programs provided by the transmission device 1, and decodes each of the video streams making up a multiplexed stream. Also, the reception device 2 causes the screen 3 to display the pictures obtained by decoding the respective video streams, in accordance with the information included in the compose information. The pictures displayed on the screen 3 in accordance with the information included in the compose information are the pictures constituting a single program, so that the user can view that one program.

Figure 2:
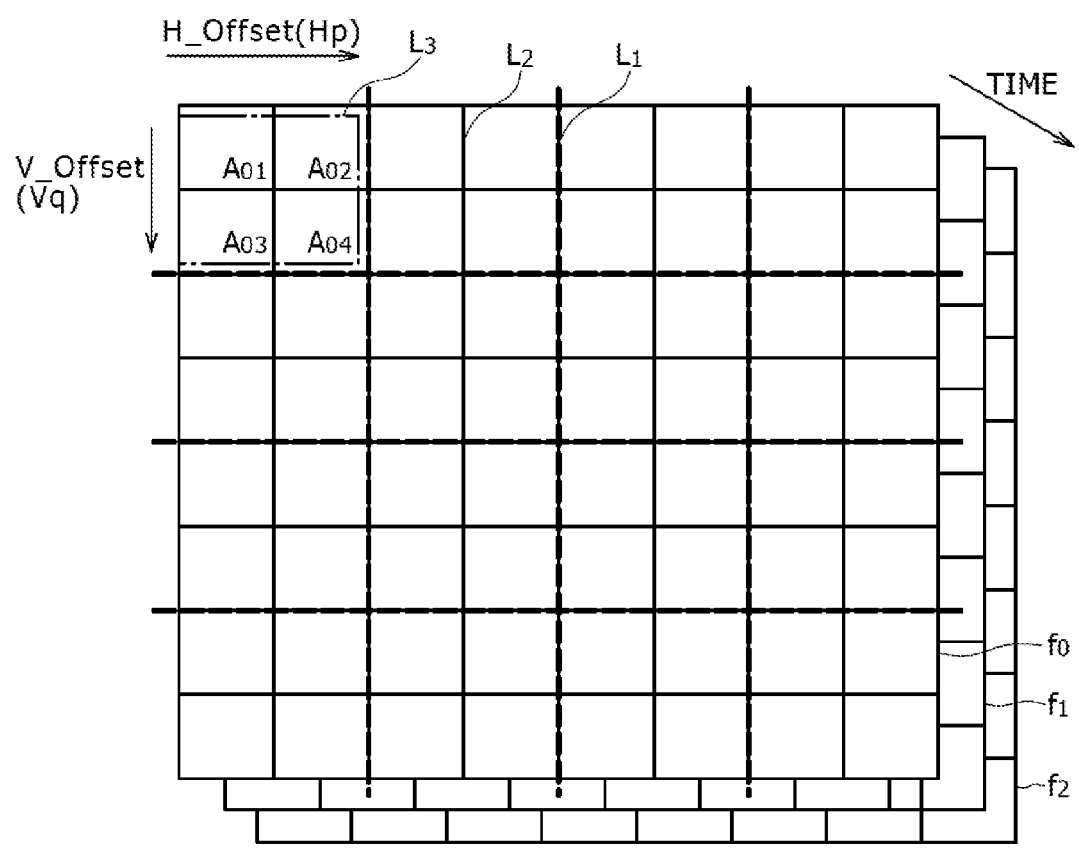
FIG. 2 is a view showing the concept of compose information.

FIG. 2 is a view showing the concept of compose information.

As shown in FIG. 2, the compose information is made up of a predetermined number of compose maps arrayed chronologically for reference purposes. Each of the compose maps denotes, among others, the screens on which to display pictures and those positions on each screen in which to display the pictures.

A compose map f0 in FIG. 2 is the information to be referenced at a given time; a compose map f1 is the information to be referenced at a time subsequent to the time at which the compose map f0 is referenced; and a compose map f2 is the information to be referenced at a time subsequent to the time at which compose map f1 is referenced. Where a single compose map group is made up of the compose maps f0 through f2 as shown in FIG. 2, following the reference made to the compose map f2 for picture display, the compose maps are referenced in successively repeated fashion starting from the compose map f0 for continuous picture display. The compose map group is represented by a parameter Tm.

Dotted lines L1, shown three vertically and three horizontally, denote the demarcations of screens. The areas demarcated by the dotted lines L1 indicate how pictures are to be displayed on each screen. If one screen is prepared on the side of the reception device 2 as shown in FIG. 1, then only one top left area out of the 16 areas demarcated by the dotted lines L1 is used. If 16 screens are prepared on the side of the reception device 2, then all areas of the compose map f0 are used. The screens are represented by parameters Sn.

Solid lines L2, shown seven vertically and seven horizontally including those overlapping with the dotted lines L1, indicate how one screen is to be separated. In the ensuing description, the areas formed on one screen for the display of pictures may be referred to as windows where appropriate. The screen is a picture display area established physically as a device, whereas the windows are picture display areas formed on a single screen. One window displays one picture obtained by decoding one video stream. Each of the windows is variable in size.

FIG. 2 shows an example of compose information in which four windows are formed by bisecting respectively each of the screens vertically and horizontally.

The position of each window on the screen is defined by a parameter Hp indicating the horizontal position and by a parameter Vq indicating the vertical position relative to a predetermined position such as the top left corner of the screen.

Through the use of the parameters Sn Tm, Hp and Vq, each of the windows is identified by Window_ID(Sn, Tm, Hp, Vq).

For example, the window corresponding to the top left area A01 in FIG. 2 is identified by Window_ID(S0, T0, H0, V0), by the parameter S0 indicating that this is a window formed on a first screen S0, by the parameter T0 indicating that this is a window in which the picture is displayed by referencing the first of the compose maps constituting the same compose map group, by the parameter H0 indicating that this is a window formed on the left-hand side when the screen S0 is separated into four areas, and by the parameter V0 indicating that this is a window formed on the upper side when the screen S0 is separated into four areas.

And the window corresponding to the area A04 is identified by Window_ID(S0, T0, H1, V1), by the parameter S0 indicating that this is a window formed on the first screen S0, by the parameter T0 indicating that this is a window in which the picture is displayed by referencing the first of the compose maps constituting the same compose map group, by the parameter H1 indicating that this is a window formed on the right-hand side when the screen S0 is separated into four areas, and by the parameter V1 indicating that this is a window formed on the lower side when the screen S0 is separated into four areas.

Likewise, the window corresponding to the area A02 is identified by Window_ID(S0, T0, H1, V0), and the window corresponding to the area A03 is identified by Window_ID (S0, T0, H0, V1).

The compose information includes PIDs of video streams indicating which video streams are to be decoded into pictures for display in the windows identified as described above. The compose information also includes information designating the screen size (screen resolution targeted by the transmission device 1) indicated by dashed lines L3 in FIG. 2.

Specific descriptions of the compose information will be discussed later.

Figure 3:
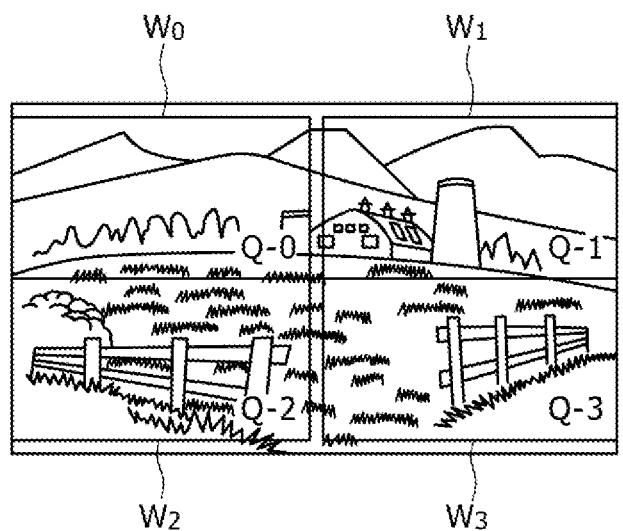
FIG. 3 is a view showing typical windows displayed on a screen based on the compose information.

FIG. 3 is a view showing typical windows displayed on the screen 3 based on the compose information.

FIG. 3 shows an example where the picture of one program taken by one camera is separated into four areas per frame and where the pictures of the respective separated areas are encoded, as the separate streams, into four video streams which in turn are multiplexed, whereby the program is provided.

In this case, based on the compose information attached to the multiplexed stream, the reception device 2 forms windows W0, W1, W2, and W3 in the top left area, top right area, bottom left area, and bottom right area of the screen 3 respectively.

In the compose information, as described above in reference to FIG. 2, the window W0 is identified by Window_ID (S0, T0, H0, V0), the window W1 by Window_ID(S0, T0, H1, V0), the window W2 by Window_ID(S0, T0, H0, V1), and the window W3 by Window_ID(S0, T0, H1, V1).

The parameter Vq included in Window_ID of the window W0 is V0, and the same parameter V0 is included in Window_ID of the window W1 as Window_ID included in the parameter Vq. Thus it is detected that the reception device 2 need only form two windows on the upper side of the screen 3.

The windows W0 and W1 are detected to be positioned left and right, respectively, based on the values of the parameter Hp included in Window_IDs of these windows.

The parameter Vq included in Window_ID of the window W2 is V1, and the same parameter V1 is included in Window_ID of the window W3 besides the window W2 as Window ID included in the parameter Vq. Thus it is detected that the reception device 2 need only form two windows on the lower side of the screen 3.

The windows W2 and W3 are detected to be positioned left and right, respectively, based on the values of the parameter Hp included in Window_IDs of these windows.

The information about the vertical and horizontal sizes of pictures is included in the video stream. Thus the windows W0 through W3 are formed by allocating the areas of the same sizes as those of the pictures in the positions detected as described above. The correspondence relations between the respective windows and the video streams used for picture display in the respective windows are also represented by the compose information.

In this manner, the reception device 2 forms the windows in accordance with the specifications given by the transmission device 1 based on the sizes of the windows (i.e., sizes of the pictures to be displayed in the windows) and on the positions of the windows.

And the relations of correspondence between PID and Window_ID included in the compose information are detected by the reception device 2, with the window W0 displaying a picture Q-0 obtained by decoding the video stream identified by a relevant PID. The same applies to the windows W1 through W3; pictures Q-1 through Q-3 are displayed after being obtained by decoding the video streams identified by the respective relevant PIDs.

When the pictures Q-0 through Q-3 are arranged to appear in mutually synchronized fashion, the screen 3 displays the picture of the original single program taken by one camera.

When the compose information is utilized as described above, the transmission device 1 enables the reception device 2 to display on the screen 3 one big original picture based not on a single video stream but on four separate video streams.

Figure 4:
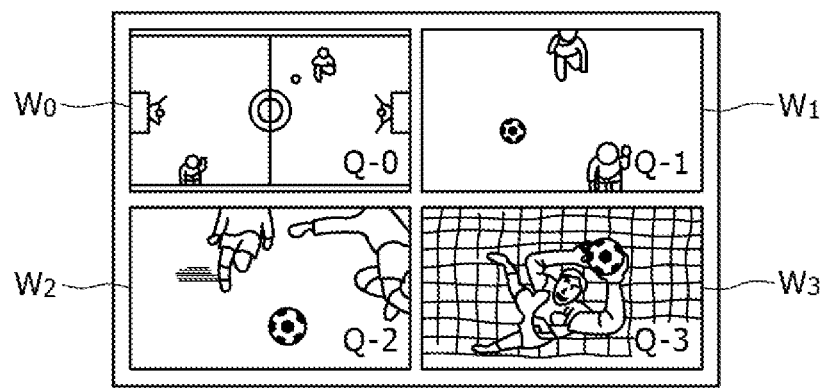
FIG. 4 is a view showing other typical windows displayed on the screen based on the compose information.

FIG. 4 is a view showing other typical windows displayed on the screen 3 based on the compose information.

FIG. 4 shows an example where the pictures of a soccer match taken as those of one broadcast program by four cameras set up at four different locations are encoded into four different streams which in turn are multiplexed, whereby the program is provided.

In this case, as with the case explained above by referring to FIG. 3, the reception device 2 forms windows W0, W1, W2, and W3 in the top left, top right, bottom left, and bottom right areas of the screen 3, respectively, based on the compose information added to the multiplexed stream.

In the compose information, the window W0 of FIG. 4 is also identified by Window_ID(S0, T0, H0, V0), and the window W1 is identified by Window_ID(S0, T0, H1, V0). The window W2 is identified by Window_ID(S0, T0, H0, V1), and the window W3 is identified by Window_ID(S0, T0, H1, V1). From each parameter constituting Window_ID included in the compose information, it is detected that the reception device 2 need only bisect the screen 3 vertically and horizontally respectively into four windows.

And the correspondence relations between PID and Window_ID included in the compose information are detected by the reception device 2, with the window W0 displaying a picture Q-0 which is obtained by decoding the video stream identified by a relevant PID and which represents the picture of the soccer broadcast being taken from a given angle. The same applies to the windows W1 through W3; pictures Q-1 through Q-3 are displayed after being obtained by decoding the video streams identified by the respective relevant PIDs, the pictures representing those of the soccer broadcast taken from different angles respectively.

When the pictures Q-0 through Q-3 are arranged to appear in mutually synchronized fashion, the screen 3 displays the pictures of the original single program taken by the four cameras.

When the compose information is utilized as described above, the transmission device 1 can respectively display a plurality of pictures of one program taken by a plurality of cameras in the relevant positions on the screen 3 of the reception device 2.

Figure 5:
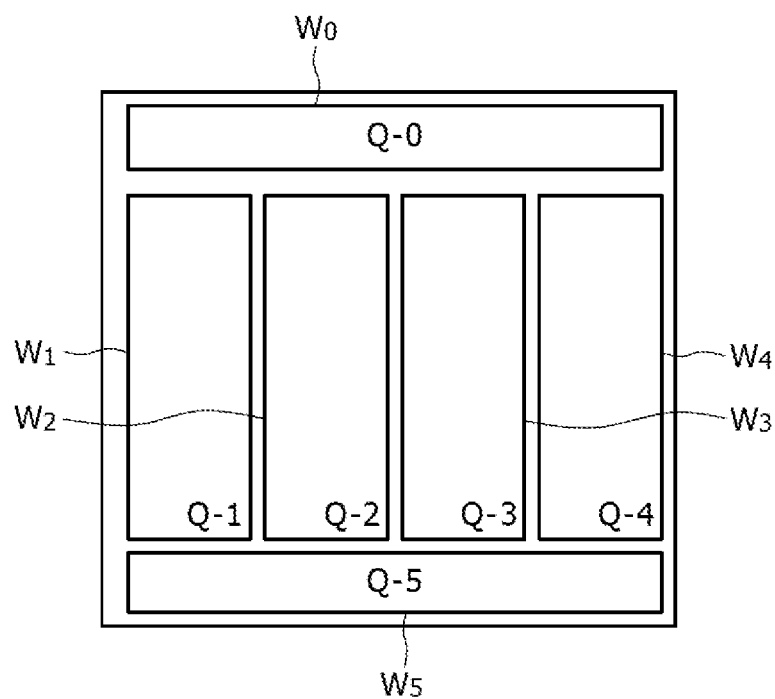
FIG. 5 is a view showing other typical windows displayed on the screen based on the compose information.

FIG. 5 is a view showing other typical windows displayed on the screen 3 based on the compose information.

FIG. 5 shows an example where the pictures of one program taken by six cameras are encoded respectively into six video streams which in turn are multiplexed, whereby the program is provided.

In this case, based on the compose information added to the multiplexed stream, a window W0 having approximately the same width as the horizontal width of the screen is formed in the uppermost area of the screen 3; in the second area from the top of the screen 3 are formed windows W1 through W4 each having a width equal to one of four equal parts making up the horizontal width of the screen 3; and a window W5 having approximately the same width as the horizontal width of the screen 3 is formed in the lowermost area of the screen 3.

In the compose information, the window W0 is identified by Window_ID(S0, T0, H0, V0), the window W1 is identified by Window_ID(S0, T0, H0, V1), and the window W2 is identified by Window_ID(S0, T0, H1, V1). The window W3 is identified by Window_ID(S0, T0, H2, V1), the window W4 is identified by Window_ID(S0, T0, H3, V1), and the window W5 is identified by Window_ID(S0, T0, H0, V2).

The parameter Vq included in Window_ID of the window W0 is V0, and there is no other Window_ID that would include the same V0 in the parameter Vq. Thus it is detected that the reception device 2 need only form one window in the uppermost area of the screen 3.

The parameter Vq included in Window_ID of the window W1 is V1, and there are Window_IDs of the windows W2, W3, and W4 which include the same V1 in the parameter Vq besides the Window W1. Thus it is detected that the reception device 2 need only form four windows in the second area from the top of the screen 3.

Also, as for the order of the windows W1 through W4, the windows W1, W2, W3, and W4 are detected to be positioned from left to right, in that order, based on the values of the parameter Hp included in Window_IDs of the respective windows.

The parameter Vq included in Window_ID of the window W5 is V2, and there is no other Window_ID that would include the same V2 in the parameter Vq. Thus it is detected that the reception device 2 need only form one window in the lowermost area of the screen 3.

From the positions of the windows W0 through W5 detected as described above and from the picture size information included in each of the six video streams, it is detected that the reception device 2 need only form the respective windows as shown in FIG. 5.

And the correspondence relations between PID and Window_ID included in the compose information are detected by the reception device 2, with the window W0 displaying a picture Q-0 obtained by decoding the video stream identified by a relevant PID. The same applies to the windows W1 through W5; pictures Q-1 through Q-5 are displayed after being obtained by decoding the video streams identified by the respective relevant PIDs.

When the pictures Q-0 through Q-5 are arranged to appear in mutually synchronized fashion, the screen 3 displays illustratively a panorama-view picture of the original single program taken by a plurality of cameras.

When the compose information is utilized as described above, the transmission device 1 separates the panorama-view picture taken by a plurality of video cameras into six video streams to be provided, thus allowing the reception device 2 to display the original single panorama-view picture on the screen 3.

Figure 6:
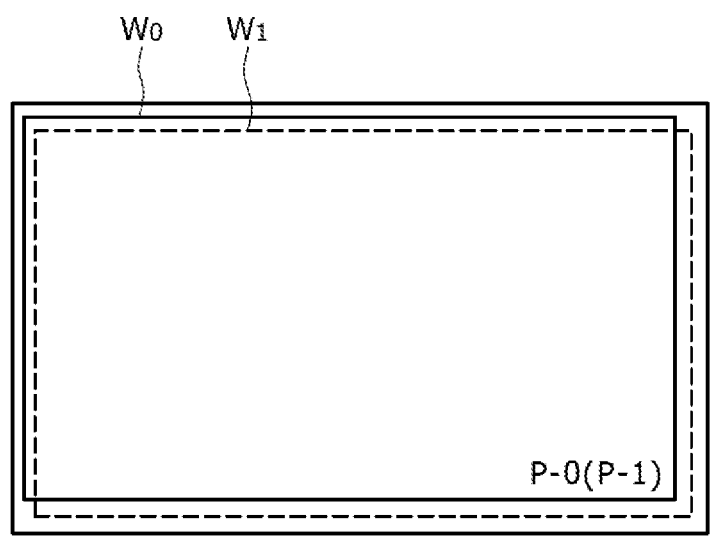
FIG. 6 is a view showing a typical window displayed on the screen based on the compose information.

FIG. 6 is a view showing a typical window displayed on the screen 3 based on the compose information.

FIG. 6 shows an example in which pictures of an object are taken from left and right by two cameras set up at two different locations, the taken pictures being encoded into two video streams, as different streams respectively, which in turn are multiplexed, whereby the program is provided.

In this case, based on the compose information added to the multiplexed stream, a window W0 and a window W1 are formed alternately in a chronologically staggered manner by the reception device 2 over the entire screen 3. In FIG. 6, the window W1 is indicated by broken lines because it is formed at a time different from the time at which the window W0 is formed.

In the compose information, the window W0 is identified by Window_ID(S0, T0, H0, V0) and the window W1 by Window_ID(S0, T1, H0, V0).

The parameter Tm included in Window_ID of the window W0 is T0, and the parameter Tm included in Window ID of the window W1 is T1. Thus it is detected that the reception device 2 need only form the windows W0 and W1 at different times.

Based on the information about the compose map group included in the compose information, it is also detected that the windows W0 and W1 need only be formed alternately, as window W0, window W1, window W0, window W1, From the fact that there is no window other than the window W0 that needs to be formed at the time of T0, and from the information in the video stream about the size of the picture to be displayed in the window W0, it is detected that the reception device 2 need only form the window W0 over the entire screen 3.

Likewise, from the fact that there is no window other than the window W1 that needs to be formed at the time of T1, and from the information in the video stream about the size of the picture to be displayed in the window W1, it is detected that the reception device 2 need only form the window W1 over the entire screen 3.

The correspondence relations between PID and Window_ID included in the compose information are detected by the reception device 2. The window W0 formed at a given time displays a picture P-0 which is obtained by decoding the video stream identified by a relevant PID and which depicts the object as it is taken from left for example.

And the window W1 formed at a time subsequent to the time at which the window W0 was formed displays a picture P-1 which is obtained by decoding the video stream identified by a relevant PID and which depicts the object as it is taken from right.

Figures 7, 8:
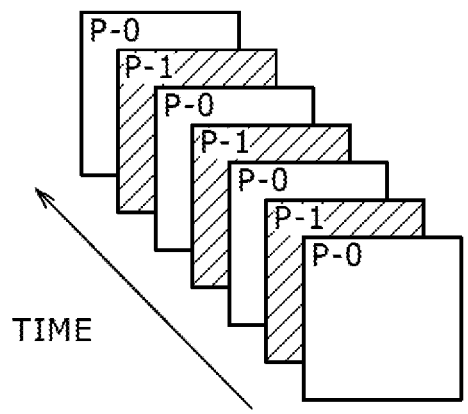
FIG. 7 is a view showing how pictures are typically changed.
FIG. 8 is a view showing typical descriptions of the compose information.

Thus when the displays of the pictures P-0 and P-1 are switched alternately in a predetermined cycle by use of the compose information as shown in FIG. 7, the transmission device 1 enables the reception device 2 to display a 3-D picture on the screen 3 by taking advantage of the human's parallax. FIG. 8 is a view showing typical descriptions of the compose information. The numbers shown on the left-hand side of FIG. 8 together with a colon (:) each are given only for explanatory purposes and do not constitute any part of the compose information.

A description "Window_Linkage_flag" on line 1 indicates the presence of a plurality of windows. A description "If (Window_Linkage_Flag) on line 2 and subsequent descriptions on the lines that follow constitute the content of the compose information.

A description "Number_of_Screens, S" on line 3 denotes the number S of screens targeted by the compose information. The number S is variable. In the above example, the number S is 1.

A description "For(i=0; i<S; i++)" on line 4 and subsequent descriptions on the lines that follow indicate how display should be made in the respective screens. If there are a plurality of screens targeted by the compose information, then the compose information includes as many sets of the descriptions on line 4 and subsequent lines as the number of the targeted screens.

A description "Direction_Mapping" on line 5 indicates the screen being targeted.

A description "Target_Display_Size" on line 6 indicates the size of the targeted screen. As will be discussed later, if the size of the screen targeted by the transmission device 1 is different from the size of the screen actually prepared by the reception device 2, then the picture will be scaled up or down by the reception device 2 as needed.

A description "Number_of_Windows_per_screen, N" on line 7 indicates the number N of screens to be formed on a highlighted screen. The number N is variable. In the examples of FIGS. 3 and 4, the number N is 4.

A description "For(j=0; j<N; j++)" on line 8 and subsequent descriptions on the lines that follow indicate how display should be made in the respective windows. If there are a plurality of windows targeted by the compose information, then the compose information includes as many sets of the descriptions on line 8 and subsequent lines as the number of the targeted windows.

A description "Elementary_PID" on line 9 indicates the PID of the video stream used for picture display in the highlighted window, i.e., the correspondence relation between the window and the video stream.

A description "Window_id" on line 10 is the identification information about the highlighted window and is made up of the parameters explained above.

A description "FrameGroup" on line 11 indicates the time (chronological ID) at which to form the highlighted window, i.e., when to make a switch to the window.

A description "V_offset" on line 12 indicates the vertical position of the highlighted window on the screen, as with the parameter Vq included in the description Window_id.

A description "H_offset" on line 13 indicates the horizontal position of the highlighted window on the screen, as with the parameter Hp included in the description Window_id.

Based on the compose information constituted by the foregoing descriptions, the display discussed above is implemented.

Explained hereunder are the structures of the transmission device 1 and reception device 2.

Figure 9:
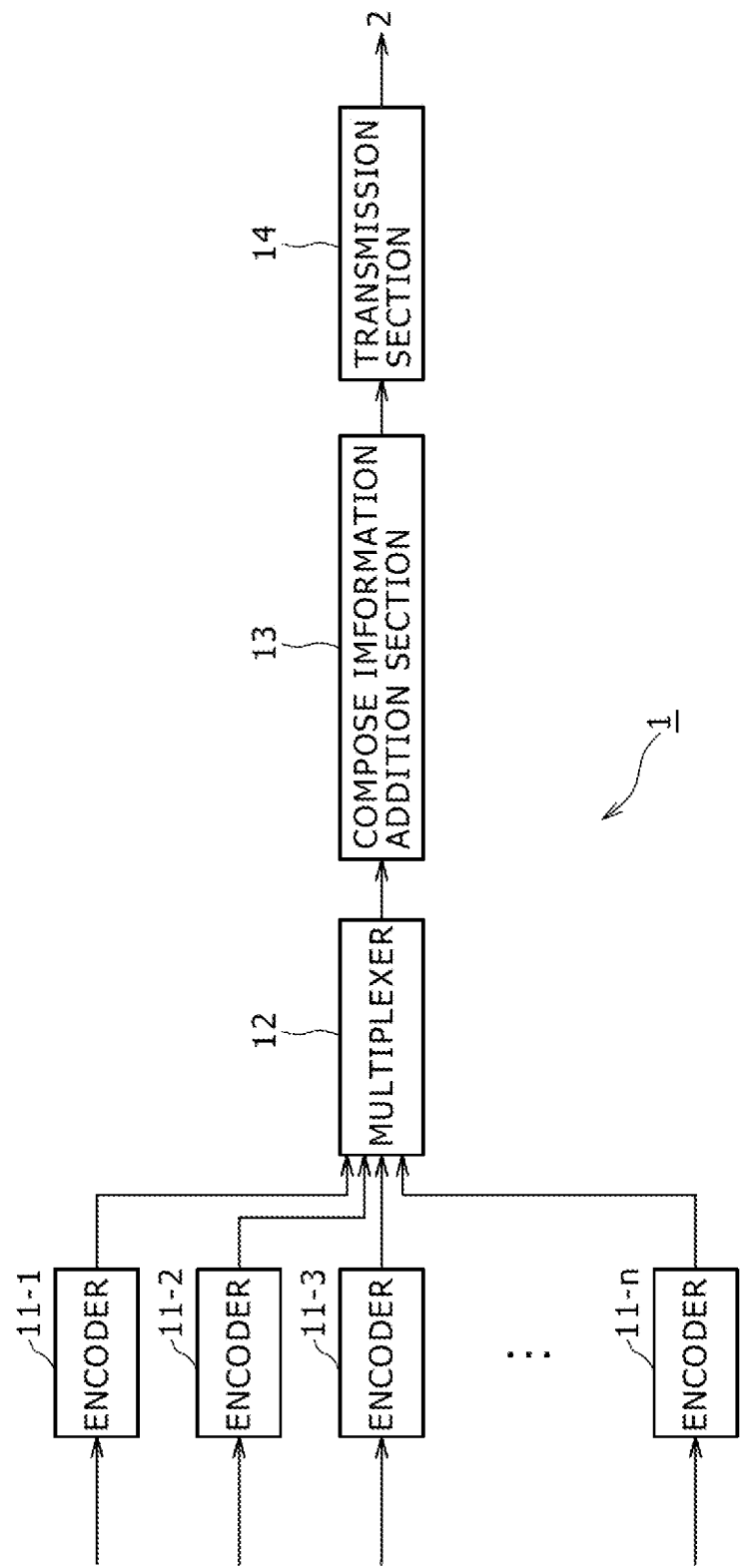
FIG. 9 is a block diagram showing a typical structure of a transmission device.

FIG. 9 is a block diagram showing a typical structure of the transmission device 1.

As shown in FIG. 9, the transmission device 1 is made up of encoders 11-1 through 11-$n$, a multiplexer 12, a compose information addition section 13, and transmission section 14. There are provided as many encoders as the number of picture signals which constitute a single program and which are input from the outside.

Each of the encoders 11-1 through 11-$n$ encodes the signal input from a camera into a video stream, and outputs the video stream obtained through encoding to the multiplexer 12.

The multiplexer 12 multiplexes the video streams coming from the encoders 11-1 through 11-$n$ into a multiplexed stream, and outputs the multiplexed stream thus obtained to the compose information addition section 13.

In accordance with the input from an administrator of the transmission device 1, the compose information addition section 13 generates compose information constituted by descriptions such as those shown in FIG. 8, and adds the generated compose information to the multiplexed stream supplied from the multiplexer 12. The compose information addition section 13 outputs the multiplexed stream with the compose information added thereto to the transmission section 14.

As for synchronism management, PCR and the timestamp of a representative stream may be extracted and copied to those positions of other streams which correspond to the same timing, whereby synchronism between the streams may be guaranteed.

The transmission section 14 transmits the program constituted by the multiplexed stream supplied from the compose information addition section 13 to the reception device 2 using broadcast waves or by way of networks. If the program is to be provided by means of recording media, the transmission section 14 records the multiplexed stream to the recording media that will be offered to the reception device 2.

Figure 10:
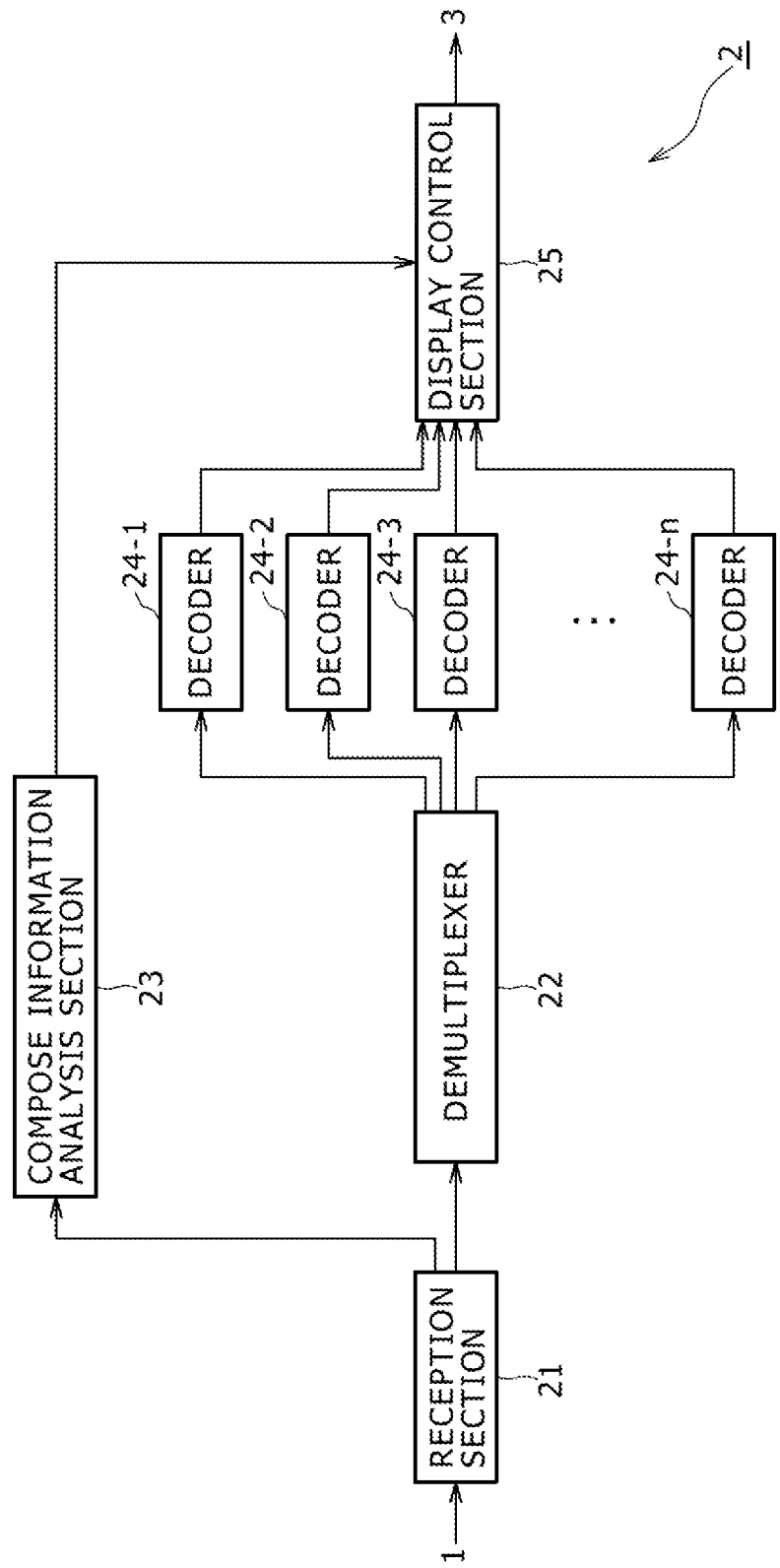
FIG. 10 is a block diagram showing a typical structure of a reception device.

FIG. 10 is a block diagram showing a typical structure of the reception device 2.

As shown in FIG. 10, the reception device 2 is made up of a reception section 21, a demultiplexer 22, a compose information analysis section 23, decoders 24-1 through 24-$n$, and a display control section 25. There are also provided as many decoders as the number of pictures constituting a single program.

The reception section 21 receives a program transmitted by the transmission device 1. The reception section 21 outputs the multiplexed stream constituting the received program to the demultiplexer 22, and outputs the compose information added to the multiplexed stream to the compose information analysis section 23.

The demultiplexer 22 separates the multiplexed stream supplied from the reception section 21 into a plurality of video streams, and outputs the separated video streams to the decoders 24-1 through 24-$n$ on a one-stream-to-one-decoder basis.

By analyzing the compose information supplied from the reception section 21, the compose information analysis section 23 detects the times at which to form windows on the screen 3, those positions on the screen 3 in which to form the windows, and the sizes of the windows. The compose information analysis section 23 outputs information designating the detected timings, window positions, and window sizes to the display control section 25. The demultiplexer 22 supplies information designating the sizes of the pictures included in the respective video streams.

Also, the compose information analysis section 23 analyzes the compose information in order to detect the correspondence relations between the windows and the video streams, thus outputting to the display control section 25 information designating the windows in which to display pictures and the video streams to be decoded into the pictures for display in the designated windows.

The decoders 24-1 through 24-$n$ decode the video streams supplied from the demultiplexer 22 into picture signals, and outputs the picture signals obtained through decoding to the display control section 25. The picture signals include information indicating the video stream from which each picture signal is acquired through decoding.

The display control section 25 forms the windows on the screen 3 in suitably timed fashion in accordance with the information supplied from the compose information analysis section 23.

Also, in accordance with the information supplied from the compose information analysis section 23, the display control section 25 detects the windows in which to display pictures, and the signals from which to derive the pictures to be displayed in the windows and which have been supplied from the decoders 24-1 through 24-n. In keeping with the results of the detection, the display control section 25 displays the pictures based on the signals from the decoders 24-1 through 24-n in the windows formed on the screen 3.

Explained below are the processes performed by the transmission device 1 and reception device 2 structured as described above.

Figure 11:
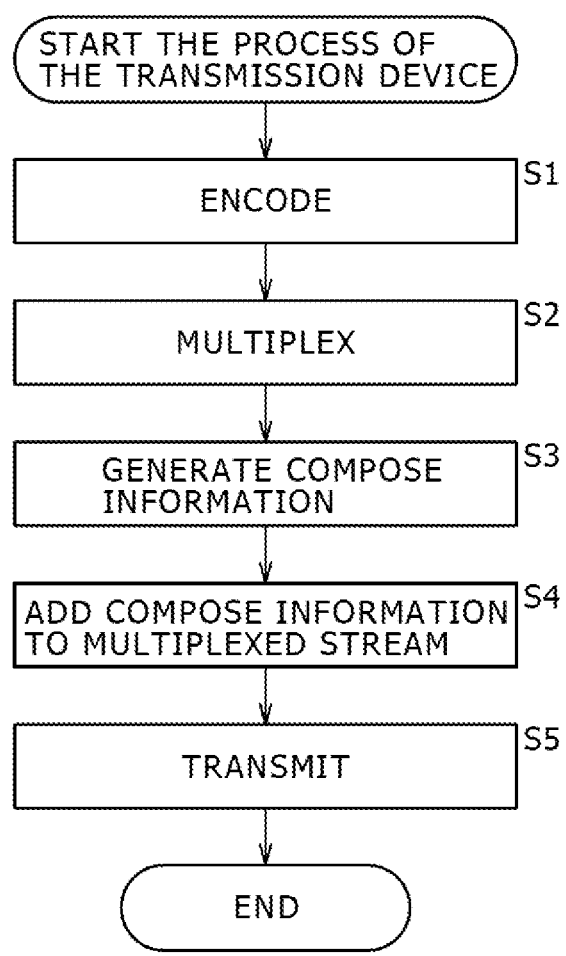
FIG. 11 is a flowchart explaining the process of the transmission device.

First, the process of the transmission device 1 is explained in reference to the flowchart of FIG. 11.

This process is started upon input of signals from cameras.

In step S1, the encoders 11-1 through 11-n encode the input signals into video streams, and output the video streams obtained through encoding to the multiplexer 12.

In step S2, the multiplexer 12 multiplexes the video streams supplied from the encoders 11-1 through 11n into a multiplexed stream, and outputs the multiplexed stream thus obtained to the compose information addition section 13.

In step S3, the compose information addition section 13 generates compose information in accordance with the input from the administrator of the transmission device 1.

In step S4, the compose information addition section 13 adds the compose information to the multiplexed stream supplied from the multiplexer 12, and outputs the multiplexed stream with the compose information added thereto to the transmission section 14.

In step S5, the transmission section 14 transmits to the reception device 2 the program constituted by the multiplexed stream supplied from the compose information addition section 13, and terminates the process.

Figure 12:
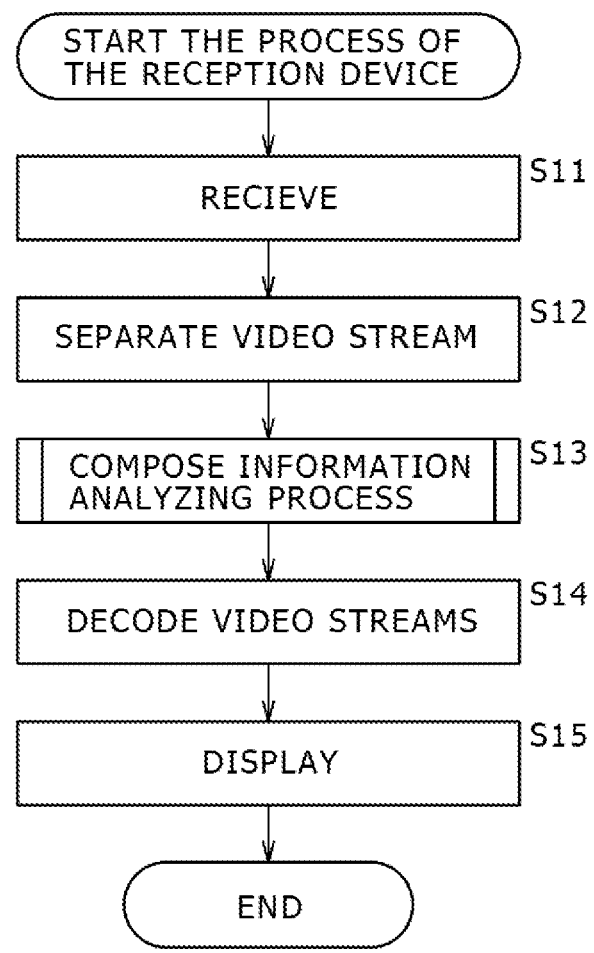
FIG. 12 is a flowchart explaining the process of the reception device.

Explained below in reference to the flowchart of FIG. 12 is the process of the reception device 2. This process is started when a multiplexed stream constituting a program is transmitted from the transmission device 1.

In step S11, the reception section 21 receives the program transmitted from the transmission device 1. The reception section 21 outputs the multiplexed stream making up the received program to the demultiplexer 22, and outputs the multiplexed stream and compose information to the compose information analysis section 23.

In step S12, the demultiplexer 22 separates the multiplexed stream supplied from the reception section 21 into a plurality of video streams, and outputs the separated video streams to the decoders 24-1 through 24-n.

In step S13, a compose information analyzing process is performed. Carrying out the compose information analyzing process allows the compose information analysis section 23 to supply the display control section 25 with information about the windows to be formed on the screen 3 as well as information about the pictures to be displayed in the respective windows. The compose information analyzing process will be discussed later in reference to the flowchart of FIG. 13.

In step S14, the decoders 24-1 through 24-n decode the video streams supplied respectively from the demultiplexer 22 into pictures signals, and outputs the picture signals obtained through decoding to the display control section 25.

In step S15, the display control section 25 forms the windows on the screen 3 in suitably timed fashion in accordance with the information supplied from the compose information analysis section 23, and displays the pictures based on the signals from the decoders 24-1 through 24-n in the respective windows thus formed.

Figure 13:
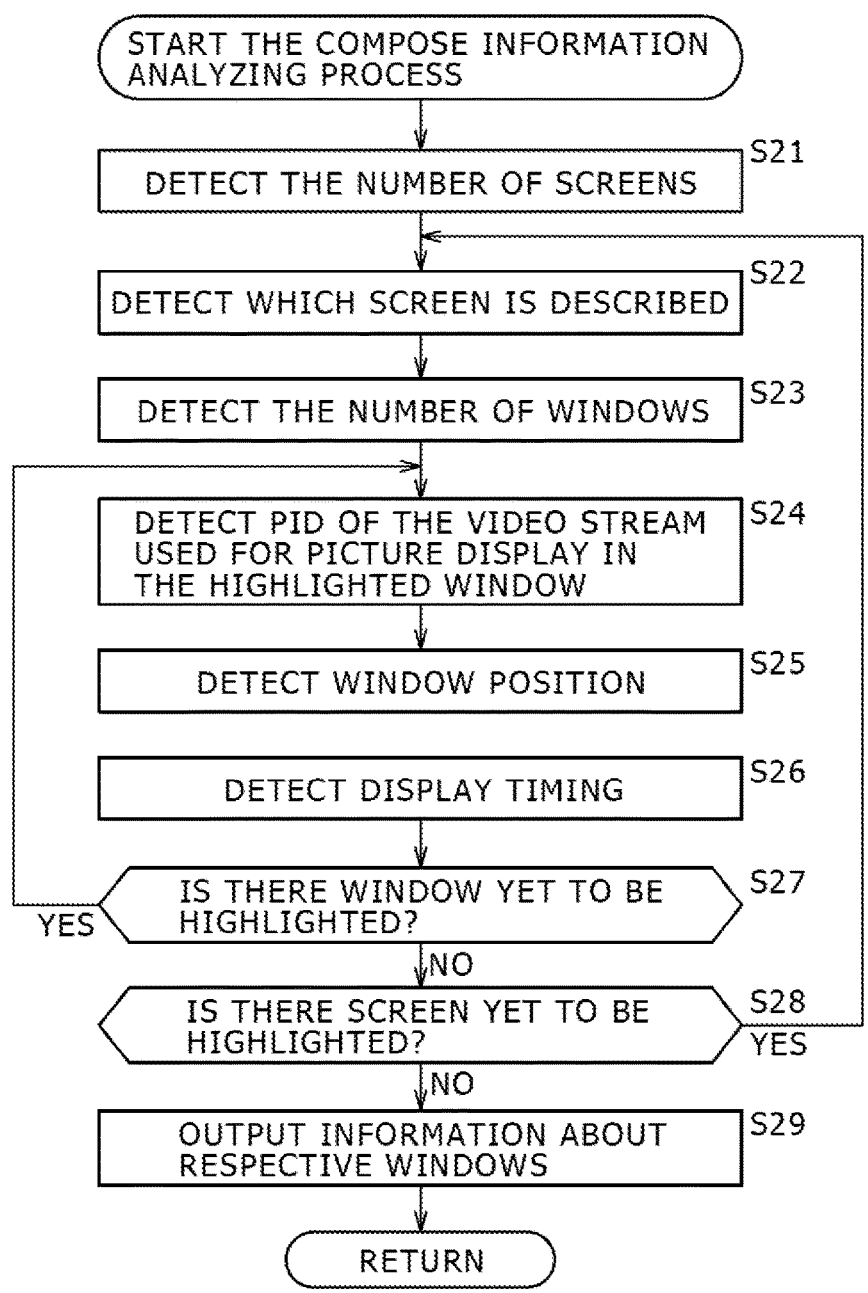
FIG. 13 is a flowchart explaining a compose information analyzing process performed in step S13 of FIG. 12.

Explained below in reference to the flowchart of FIG. 13 is the compose information analyzing process performed in step S13 of FIG. 12.

In step S21, the compose information analyzing section 23 detects the number of screens targeted by the compose information in accordance with the description "Number_of_Screens, S" included in the compose information.

In step S22, based on the description "Direction_Mapping," the compose information analysis section 23 detects which screen is targeted by the descriptions of the compose information subsequent to "Direction_Mapping." The compose information analysis section 23 highlights the targeted screen thus detected and proceeds to the subsequent steps.

In step S23, the compose information analysis section 23 detects the number of windows to be formed on the highlighted screen based on the description "Number_of_Windows_per_screen, N."

In step S24, the compose information analysis section 23 highlights the window identified by "Window_id" and, based on the description "Elementary_PID," detects PID of the video stream for use in displaying the picture in the highlighted window. Also, the compose information analysis section 23 detects the size of the highlighted window based on the picture size information included in the video stream used to display the picture in the highlighted window.

In step S25, the compose information analysis section 23 detects the position of the highlighted window based either on the descriptions "V_offset" and "H_offset," or on the parameters included in the description "Window_id."

In step S26, the compose information analysis section 23 detects the time at which to form the highlighted window and other data based on the description "FrameGroup."

In step S27, the compose information analysis section 23 checks whether any of the windows to be formed on the highlighted screen has yet to be highlighted.

If it is found in step S27 that there exist windows yet to be highlighted, the compose information analysis section 23 highlights another window, and repeats step S24 and subsequent steps.

If it is found in step S27 that there is no window yet to be highlighted, then step S28 is reached. In step S28, the compose information analysis section 23 checks whether there exist screens which are targeted by the compose information and which have yet to be highlighted.

If it is found in step S28 that there exist screens yet to be highlighted, the compose information analysis section 23 highlights another screen, and repeats step S22 and subsequent steps.

If it is found in step S28 that there is no screen yet to be highlighted, then step S29 is reached. In step S29, the compose information analysis section 23 outputs to the display control section 25 the information about the respective screens, including information about the positions and sizes of the windows to be formed on each of the screens and information about PIDs of the video streams for use in displaying pictures in the respective windows.

Thereafter, control is returned to step S13 of FIG. 12, and the subsequent steps are carried out.

When the above steps are performed, the transmission device 1 can control on its own initiative the manner in which the reception device 2 should display pictures by use of the compose information. This allows the transmission device 1 to have the reception device 2 display the picture of a single program constituted by the pictures of a plurality of video streams as intended by the program's producer.

If the size of the screen targeted by the transmission device 1 is different from the size of the screen 3 set up on the side of the reception device 2, then the display control section 25 may up-convert or down-convert the sizes of the pictures to be displayed in the windows.

For example, suppose that the screen targeted by the transmission device 1 has a size of 2000 by 1000 pixels and that the screen 3 established on the side of the reception device 2 has a size of 1000 by 500 pixels. If the picture per frame of a program is displayed based on the pictures of four video streams as shown in FIG. 3, then the transmission device 1 multiplexes the four video streams obtained by encoding the pictures having the size of 1000 by 500 pixels into a stream that is provided.

In this case, the reception device 2 decodes one video stream into the picture having the size of 1000 by 500 pixels. This picture is down-converted to a picture with a size of 500 by 250 pixels by the display control section 25.

Each of the four video streams is down-converted likewise. This allows the screen 3 to display the same picture as envisaged by the transmission device 1, though in a different size.

The foregoing paragraphs explained the case where one screen is set up on the side of the reception device 2. Alternatively, a plurality of screens may be established.

Figure 14:
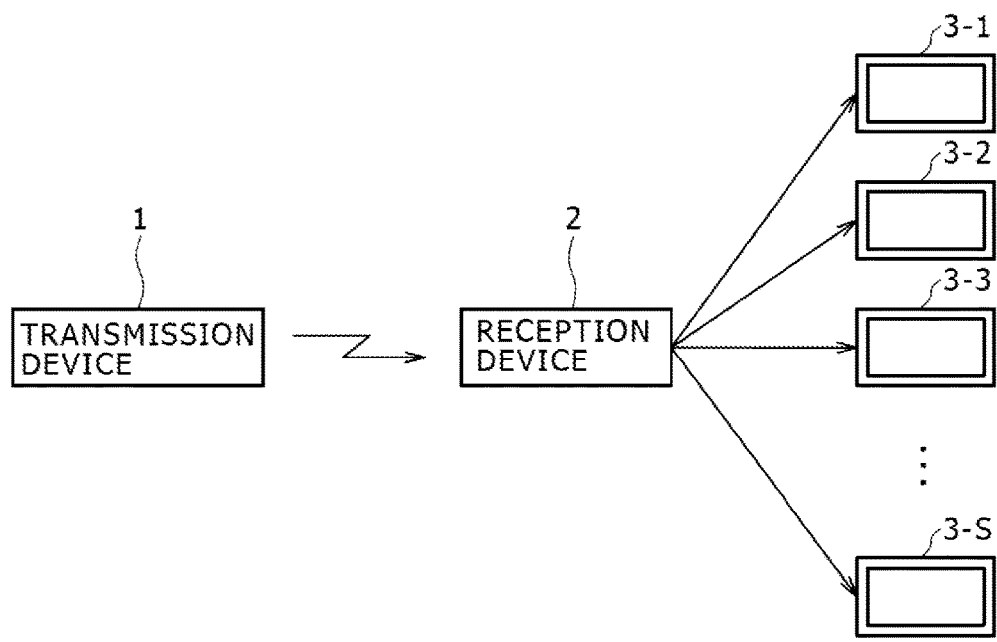
FIG. 14 is a view showing another typical configuration of the providing system.

FIG. 14 is a view showing another typical configuration of the providing system.

In the example of FIG. 14, screens 3-1 through 3-S are set up on the side of the reception device 2. The reception device 2 forms a predetermined number of windows on each of the screens so as to display a plurality of pictures constituting a single program, on the basis of the compose information added to the multiplexed stream supplied by the transmission device 1.

It is assumed that the administrator of the transmission device 1 generating the compose information is cognizant of the positional relations between the screens connected to the reception device 2. It is also assumed that the relations of physical connection between the respective screens are managed by the reception device 2 using connection network IDs or the like.

Figure 15:
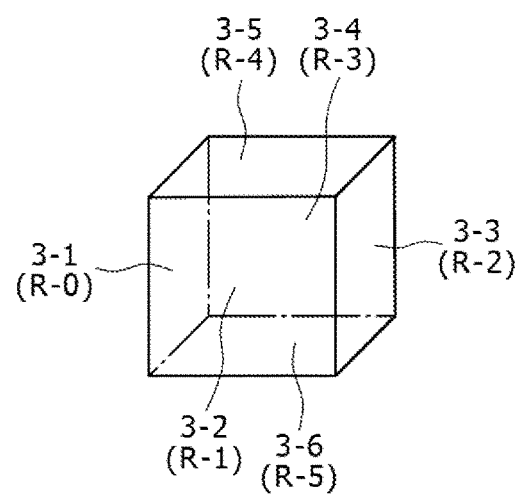
FIG. 15 is a perspective view showing a typical layout of screens.

FIG. 15 is a perspective view showing a typical layout of six screens set up on the side of the reception device 2.

In the example of FIG. 15, screens 3-1 through 3-6 are established in a manner enclosing a substantially cubic space. The screens 3-1 through 3-4 are set up laterally to face the interior of the space. The screen 3-5 is located on top of the four lateral screens and facing down onto the interior of the space. The screen 3-6 is located at the bottom of the four lateral screens and facing up to the interior of the space. A user inside the space enclosed by the screens 3-1 through 3-6 can view pictures in all directions.

Figure 16:
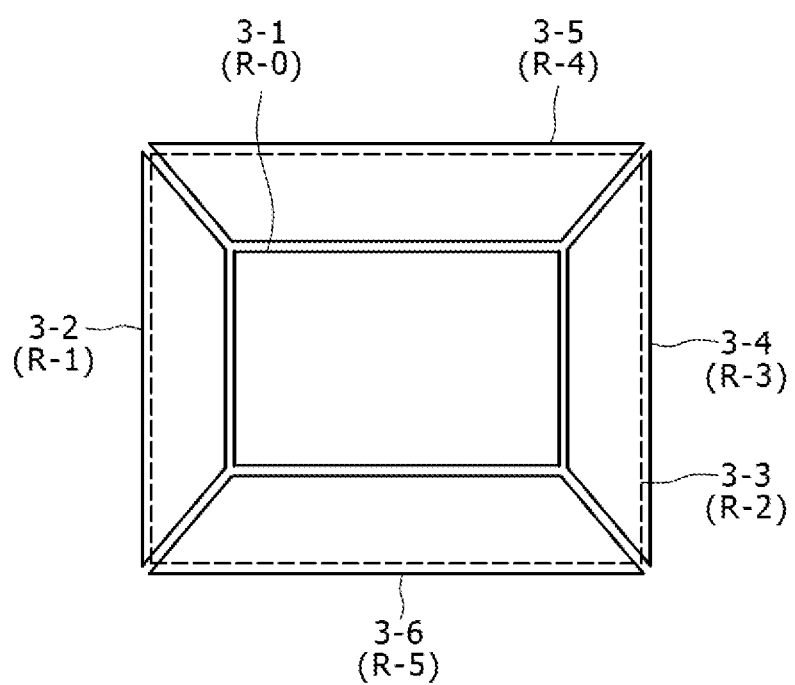
FIG. 16 is a view showing a typical layout of screens.

FIG. 16 shows the space enclosed by the screens 3-1 through 3-6 of FIG. 15 as it is viewed from the side of the screen 3-3.

FIGS. 15 and 16 show a case where pictures of a single program are taken by six cameras and encoded respectively into six video streams which in turn are multiplexed, whereby the program is provided.

In this case, based on the compose information added to the multiplexed stream, a single window is formed over the entire display area of each of the screens 3-1 through 3-6.

In the compose information, the window formed on the screen 3-1 is identified by Window_ID(S0, T0, H0, V0), the window on the screen 3-2 by Window_ID(S1, T0, H0, V0), the window on the screen 3-3 by Window_ID(S2, T0, H0, V0), the window on the screen 3-4 by Window_ID(S3, T0, H0, V0), the window on the screen 3-5 by Window_ID(S4, T0, H0, V0), and the window on the screen 3-6 by Window_ID(S5, T0, H0, V0).

From the values of the parameter Sn included in Window_IDs of the respective windows, the reception device 2 detects that each of the screens is constituted by a different window. It is also detected from the values of the parameters Hp and Vq that one window need only be formed on each screen.

The correspondence relations between PIDs and Window_IDs included in the compose information are detected by the reception device 2. The size of each of the windows is detected on the basis of the picture size information included in the video streams.

In this manner, as shown in FIG. 15, the window formed on the screen 3-1 displays a picture R-0 obtained by decoding the video stream identified by a relevant PID. Likewise, the windows formed on the screens 3-2 through 3-6 respectively display pictures R-1 through R-5 obtained by decoding the video streams identified by the respective relevant PIDs.

When the pictures R-0 through R-5 are arranged to appear in mutually synchronized fashion, the pictures of the original single program taken illustratively by a plurality of cameras in different locations are displayed.

Where the compose information is utilized as described above, the transmission device 1 enables the reception device 2 to display the pictures taken by a plurality of video cameras in different locations on a plurality of screens.

Figure 17:
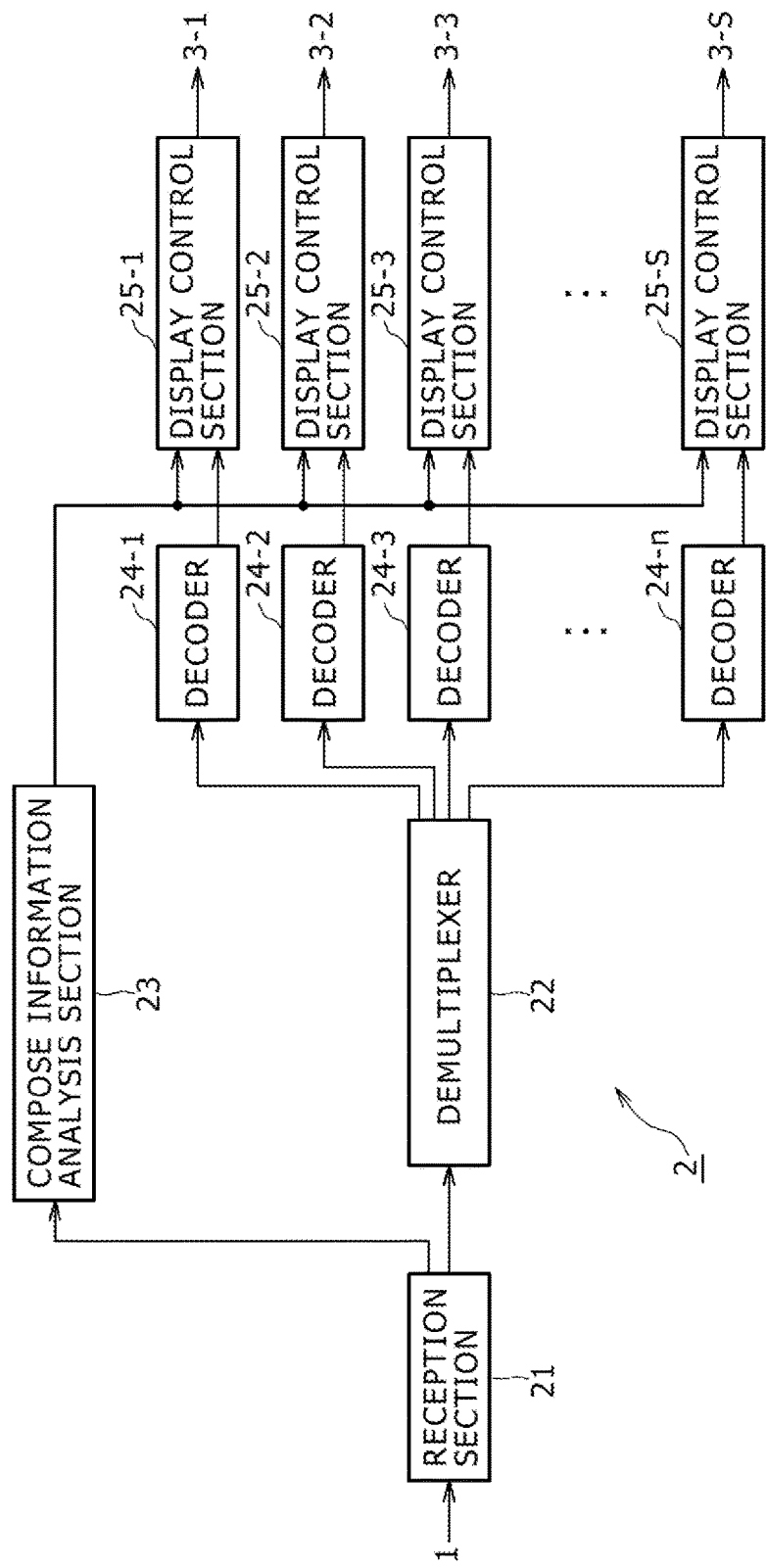
FIG. 17 is a block diagram showing another typical structure of the reception device.

FIG. 17 is a block diagram showing a typical structure of the reception device 2 connected with a plurality of screens. Of the components shown in FIG. 17, those found in FIG. 10 are designated by like reference numerals, and their descriptions may be omitted hereunder where redundant.

The structure in FIG. 17 differs from that of the reception device 2 in FIG. 10 in that there are provided as many display control sections 25-1 through 25-S as the number of the configured screens.

By analyzing the compose information supplied from the reception section 21, the compose information analysis section 23 detects the times at which to form windows on each of the screens, those positions on each screen in which to form the windows, and the sizes of the windows. The compose information analysis section 23 outputs information designating the detected timings, window positions, and window sizes to the display control sections 25-1 through 25-S.

Also, the compose information analysis section 23 analyzes the compose information in order to detect the correspondence relations between the windows and the video streams, thus outputting to the display control sections 25-1 through 25-S information designating the windows in which to display pictures and the video streams to be decoded into the pictures for display in the designated windows.

The decoder 24-1 decodes a video stream supplied from the demultiplexer 22 into a picture signal, and outputs the picture signal obtained through decoding to the display control section 25-1.

Likewise, the decoders 24-2 through 24-n decode video streams supplied from the demultiplexer 22 into picture signals, and output the picture signals obtained through decoding to the display control sections 25-2 through 25-S respectively.

FIG. 17 shows a case where, as indicated in FIG. 15, one window is formed on each screen so as to display a single picture. Where a plurality of windows are formed on a single screen in order to display a plurality of pictures therein, the outputs from a plurality of decoders are input to a single display control section.

The display control section 25-1 forms the window on the screen 3-1 in suitably timed fashion in accordance with the information supplied from the compose information analysis section 23, and causes the window thus formed to display the picture based on the signal supplied from the decoder 24-1.

Likewise, the display control sections 25-2 through 25-S form the windows on the screens 3-3 through 3-S in suitably timed fashion in accordance with the information supplied from the compose information analysis section 23, and cause the windows thus formed to display the pictures based on the signals supplied from the decoders 24-2 through 24-*n*.

In this manner, it is possible to set up a plurality of screens on the side of the reception device 2.

Also, there may be a case where there exist a plurality of multiplexed streams each including a video stream corresponding to each of the windows and where these multiplexed streams are re-multiplexed (Remux) into a big stream, whereby a program is provided. In this case, when each of the multiplexed streams to be re-multiplexed is generated, a new display-use timestamp may be set illustratively by the multiplexer 12 with regard to objects (i.e., pictures to be displayed in the windows) which are derived from the video streams making up the individual multiplexed streams and which are to be displayed simultaneously, the timestamp being also used for synchronism checks.

In the case above, the transmission device 1 uses a unified PCR (Program Clock Reference) in generating each of the multiplexed streams. This allows the reception device 2 to display the pictures based on a plurality of video streams in a manner that ensures synchronism with no contradiction.

Figure 18:
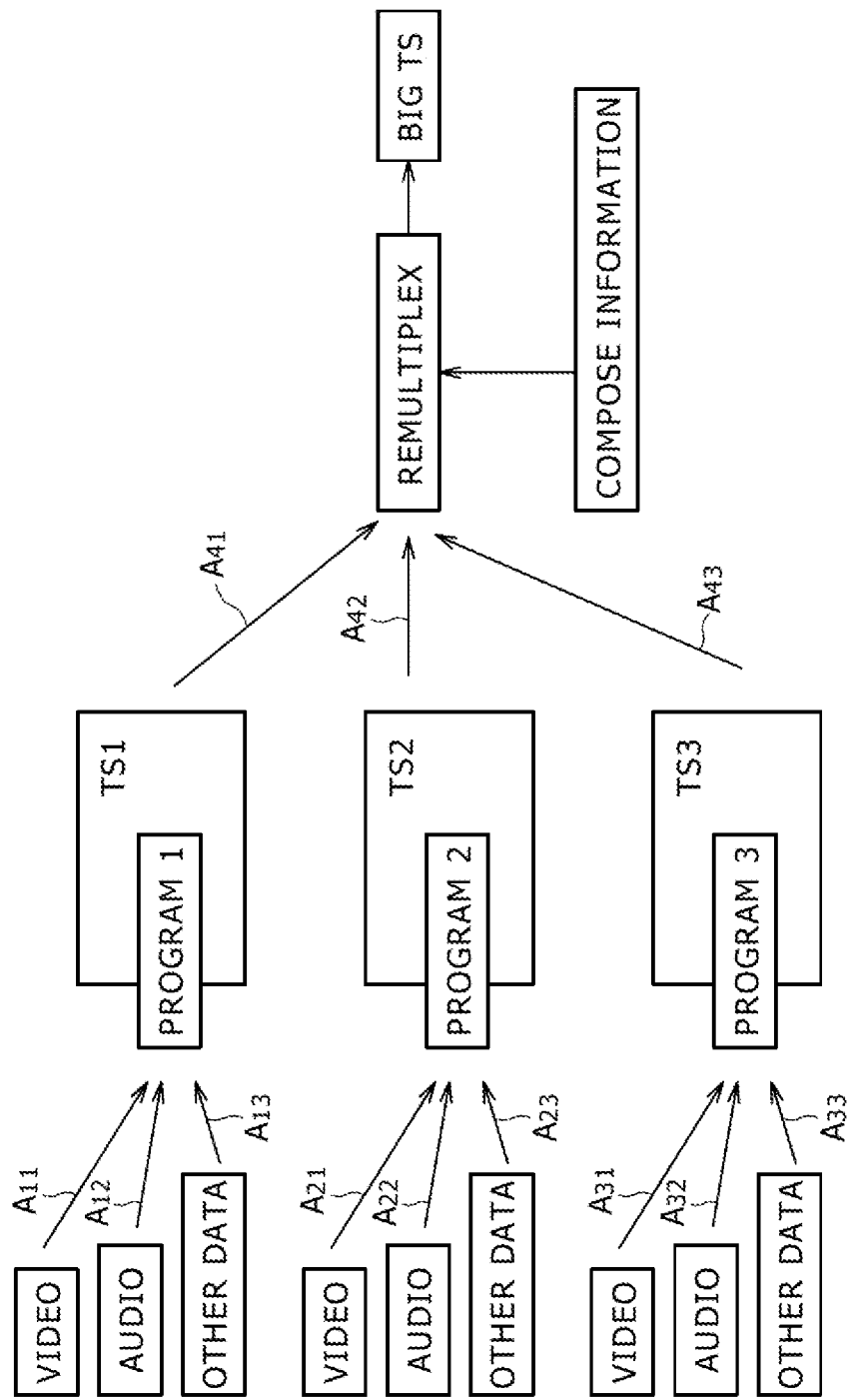
FIG. 18 is a view showing the concept of how compose information is added.

FIG. 18 is a view showing the concept of how compose information is added.

Suppose that as indicated in FIG. 18 by arrows A11 through A13, A21 through A23, and A31 through A33, video streams, audio streams and other data make up transport streams TS1, TS2 and TS3 constituting the data of programs 1, 2 and 3 respectively. In this case, as indicated by arrows A41 through A43, the transport streams TS1 through TS3 are re-multiplexed (Re-multiplex) into a stream. Adding compose information to the stream obtained through re-multiplexing generates a big TS. The big TS is a stream to be provided to the reception device 2.

FIG. 19 is a view showing where the compose information is typically inserted.

For example, the compose information is inserted into a TS Private Section defined by ISO/IEC Standard 13818-1. As shown in FIG. 19, the TS Private Section is constituted by a Table ID, a Section Syntax Indicator, a Private Indicator, a value fixed at "11," a Private Section length, and Private_Data.

In a payload of the section data, a Table ID is a data type identifier. As the Section Syntax Indicator, a value of "0" is described illustratively to represent compose information. As the Private Indicator, a value of "1" is illustratively described. For the Private Section length, the length of the section data is described. In the Private_Data, the compose information such as that shown in FIG. 8 is described.

The series of steps discussed above may be executed either by hardware or by software. Where the software-based processing is to be carried out, the programs constituting the software may be either incorporated beforehand in dedicated hardware of a computer for program execution or installed upon use from a suitable program recording medium into a general-purpose personal computer or like equipment capable of executing diverse functions based on the installed programs.

FIG. 20 is a block diagram showing a typical hardware structure of a computer for executing the above-discussed series of steps by use of programs.

A CPU (Central Processing Unit) 51, a ROM (Read Only Memory) 52, and a RAM (Random Access Memory) 53 are interconnected with one another via a bus 54.

An input/output interface 55 is further connected to the bus 54. The input/output interface 55 is connected with an input section 56 typically made up of a keyboard, a mouse, and a microphone; an output section 57 typically formed by a display and speakers; a storage section 58 typically constituted by a hard disk or a non-volatile memory; a communication section 59 typically composed of a network interface; and a drive 60 for driving removable media 61 such as an optical disk or a semiconductor memory.

In the computer structured as described above, the programs stored illustratively in the storage section 58 are loaded into the RAM 53 through the input/output interface 55 and bus 54, whereby the above-discussed series of steps are carried out.

The programs to be executed by the CPU 51 are illustratively provided as recorded on the removable media 61 or transmitted through wired or wireless media such as local area networks, the Internet, or digital broadcasts before the programs are installed into the storage section 58.

In this specification, the programs to be executed by the computer may be carried out in the depicted sequence on a time series basis, in parallel fashion, or in a suitably timed manner such as when invoked as needed.

While preferred embodiments of this invention have been described using specific terms, such description is for illustrative purposes only, and it is to be understood that changes and variations may be made without departing from the spirit or scope of the claims that follow.

The invention claimed is:

1. An information processing apparatus comprising:
a hardware structure for:
multiplexing a plurality of video streams;
adding compose information to a multiplexed stream obtained through said multiplexing, said compose information including first information identifying the video streams to be displayed external to each other and indicating display correspondence of one of the video streams in reference to other compose information, group information associated with the first information and indicating a group to which each window of one or more windows respectively corresponding to the video streams belongs, and second information designating a number of screens physically external to each other used for picture display at a same given time and associated with the first information for indicating display correspondence of the one or more windows respectively corresponding to the video streams with a given screen; and
transmitting the multiplexed stream with said added compose information.

2. The information processing apparatus according to claim 1, wherein the one or more windows formed on said given screen are variable in size.

3. The information processing apparatus according to claim 1, wherein said second information is associated with third information designating a horizontal position that one of the video streams is to be positioned and fourth information designating a vertical position that the one of said video streams is to be positioned, for indicating the vertical and horizontal positions for forming the one or more windows on the given screen.

4. The information processing apparatus according to claim 1, wherein said added compose information further includes information designating timing at which to form the one or more windows in which respectively to display the video streams.

5. The information processing apparatus according to claim 1, wherein said hardware structure sets a display timestamp for designating display timing at which to display simultaneously some pictures derived from said video streams for displaying said pictures in respective windows.

6. The information processing apparatus according to claim 1, wherein said added compose information further includes information designating size of the given screen designated by said second information.

7. An information processing method comprising the steps of:
   multiplexing a plurality of video streams;
   adding compose information to a multiplexed stream obtained through said multiplexing, said added compose information including first information identifying the video streams to be displayed external to each other and indicating display correspondence of one of the video streams in reference to other compose information, group information associated with the first information and indicating a group to which each window of one or more windows respectively corresponding to the video streams belongs, and second information designating a number of screens physically external to each other used for picture display at a same given time and associated with the first information for indicating display correspondence of the one or more windows respectively corresponding to the video streams with a given screen; and
   transmitting said multiplexed stream with said added compose information.

8. The information processing method according to claim 7, wherein the one or more windows formed on said given screen are variable in size.

9. The information processing method according to claim 7, wherein said second information is associated with third information designating a horizontal position that one of the video streams is to be positioned and fourth information designating a vertical position that the one of said video streams is to be positioned, for indicating the vertical and horizontal positions for forming the one or more windows on the given screen.

10. The information processing method according to claim 7, wherein said added compose information further includes information designating timing at which to form the one or more windows in which respectively to display the video streams.

11. The information processing method to claim 7, wherein said hardware structure sets a display timestamp for designating display timing at which to display simultaneously some pictures derived from said video streams for displaying said pictures in respective windows.

12. The information processing method according to claim 7, wherein said added compose information further includes information designating size of the given screen designated by said second information.

13. A non-transitory recording medium on which is recorded a program for causing a computer to execute a process comprising the steps of:
   multiplexing a plurality of video streams;
   adding compose information to a multiplexed stream obtained through said multiplexing, said compose information including first information identifying the video streams to be displayed external to each other and indicating display correspondence of one of the video streams in reference to other compose information, group information associated with the first information and indicating a group to which each window of one or more windows respectively corresponding to the video streams belongs, and second information designating a number of screens physically external to each other used for picture display at a same given time and associated with the first information for indicating display correspondence of the one or more windows respectively corresponding to the video streams with a given screen; and
   transmitting said multiplexed stream with said added compose information.

* * * * *